(12) United States Patent
Herman et al.

(10) Patent No.: US 6,311,736 B2
(45) Date of Patent: *Nov. 6, 2001

(54) FLEXIBLE HOSE AND METHOD FOR MANUFACTURING

(75) Inventors: John T. Herman, Dellwood; Michael J. Protas, Crystal; Wayne M. Wagner, Apple Valley, all of MN (US)

(73) Assignee: Donaldson Company, Inc., Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,073

(22) Filed: May 28, 1998

(51) Int. Cl.⁷ ................................... F16L 11/16
(52) U.S. Cl. ..................... 138/135; 138/136; 138/131
(58) Field of Search .................... 138/131, 134, 138/135, 136

(56) References Cited

U.S. PATENT DOCUMENTS

| 128,911 | | 7/1872 | Ritchie . | |
|---|---|---|---|---|
| 500,847 | | 7/1893 | Bowley . | |
| 653,487 | * | 1/1900 | Rudolph | 138/136 |
| 680,983 | * | 8/1901 | Rudolph | 138/136 |
| 680,984 | * | 8/1901 | Schoen | 138/136 |
| 922,217 | | 5/1909 | Uhri . | |
| 925,317 | * | 6/1909 | Eldred | 138/136 |
| 1,410,160 | | 3/1922 | Brinkman . | |
| 1,530,324 | | 3/1925 | Pribil . | |

(List continued on next page.)

FOREIGN PATENT DOCUMENTS

| 0 202 481 A2 | 11/1986 | (EP) . | |
|---|---|---|---|
| 0 282 689 A2 | 9/1988 | (EP) . | |
| 0 339 388 A1 | 11/1989 | (EP) . | |
| 0 410 089 A1 | 1/1991 | (EP) . | |
| 0 432 436 A2 | 6/1991 | (EP) . | |
| 0 458 011 A1 | 11/1991 | (EP) . | |
| 0 493 680 A1 | 7/1992 | (EP) . | |
| 0 527 413 A1 | 2/1993 | (EP) . | |
| 0 561 211 A1 | 9/1993 | (EP) . | |
| 0 573 764 A1 | 12/1993 | (EP) . | |
| 0 596 578 A1 | 5/1994 | (EP) . | |
| 0 719 970 A2 | 7/1996 | (EP) . | |
| 0 835 740 A2 | 4/1998 | (EP) . | |
| 0 875 712 A2 | 11/1998 | (EP) . | |
| 12482 | * 5/1914 | (GB) | 138/136 |
| 10-332056 | 12/1998 | (JP) . | |

OTHER PUBLICATIONS

May 1996 Austen B. Barnes, "Onstream Edge Finishing of Galvanized and Other Coated Materials", pp. 199–206.

Apr. 1993 Austen B. Barnes, "Preparing Strip Edges for Tube and Pipe Mills (Skiving on–stream improves edges for better welds)", *The Fabricator*, pp. 104–106.

Austen B. Barnes, "Edge Skiving System for Tube and Pipe Mill Strip", *Tube International*, pp. 267–268 (Sep. 1995).

Sales Order Acknowledgment by Senior Flexonics Ltd. to Volvo Truck North America Inc., 3 pages (Apr. 28, 1998).

* cited by examiner

Primary Examiner—James Hook
(74) Attorney, Agent, or Firm—Merchant & Gould P.C.

(57) ABSTRACT

The present disclosure relates to a flexible metal hose including a continuous metal strip having rounded lateral edges. The continuous strip is wound in a helical pattern to form a cylindrical hose body. The strip has a generally S-shaped cross section including an inner hook portion and an outer hook portion. The strip is helically wrapped such that the inner and outer hook portions of adjacent wraps interlock to form flexible joints of the hose.

19 Claims, 14 Drawing Sheets

U.S. PATENT DOCUMENTS

| | | |
|---|---|---|
| 1,570,886 | 1/1926 | Fulton et al. . |
| 1,580,760 | 4/1926 | Palmer . |
| 1,596,215 | 8/1926 | Palmer . |
| 1,598,872 | 9/1926 | Palmer . |
| 1,954,724 | 4/1934 | Collom . |
| 2,314,510 | 3/1943 | Odor . |
| 2,420,153 | 5/1947 | Sprenger et al. . |
| 2,636,083 | 4/1953 | Phillips et al. . |
| 2,832,375 | 4/1958 | Phillips . |
| 3,085,596 | 4/1963 | Rejeski . |
| 3,094,147 | 6/1963 | Nemer . |
| 3,204,666 * | 9/1965 | Lindsay et al. ............... 138/135 |
| 3,255,780 | 6/1966 | Squirrell . |
| 3,331,400 | 7/1967 | Vilkaitis . |
| 3,442,297 | 5/1969 | Wesesku . |
| 3,682,203 * | 8/1972 | Foti et al. ............... 138/135 |
| 3,687,169 * | 8/1972 | Reynard ............... 138/135 |
| 3,815,639 | 6/1974 | Westerbarkey . |
| 3,865,146 | 2/1975 | Meserole . |
| 3,938,558 | 2/1976 | Anderson . |
| 4,197,728 | 4/1980 | McGowen . |
| 4,344,462 | 8/1982 | Aubert et al. . |
| 4,597,276 | 7/1986 | Legallais et al. . |
| 4,598,739 * | 7/1986 | Bürcher ............... 138/135 |
| 4,669,757 | 6/1987 | Bartholomew . |
| 4,719,679 | 1/1988 | Fukuda . |
| 4,724,596 | 2/1988 | Pavlyak . |
| 4,727,908 | 3/1988 | Forster . |
| 4,727,909 | 3/1988 | Griffiths . |
| 4,738,008 | 4/1988 | Proctor . |
| 4,852,616 | 8/1989 | Holcomb . |
| 5,036,690 | 8/1991 | McGowen et al. . |
| 5,074,138 | 12/1991 | Miller . |
| 5,090,711 * | 2/1992 | Becker ............... 277/68 |
| 5,222,288 | 6/1993 | Thomas . |
| 5,228,479 | 7/1993 | Thomas . |
| 5,297,586 | 3/1994 | McIntosh . |
| 5,362,113 | 11/1994 | Thomas . |
| 5,601,893 | 2/1997 | Strassel et al. . |
| 5,632,513 | 5/1997 | Cassel . |
| 5,638,869 | 6/1997 | Zaborszki et al. . |
| 5,669,420 * | 9/1997 | Herrero et al. ............... 138/135 |
| 5,720,095 | 2/1998 | Lennartsson . |
| 5,768,928 | 6/1998 | Carson . |
| 5,769,463 | 6/1998 | Thomas . |
| 5,813,439 * | 9/1998 | Herrero et al. ............... 138/135 |
| 6,155,303 * | 12/2000 | Krawietz et al. ............... 138/135 |

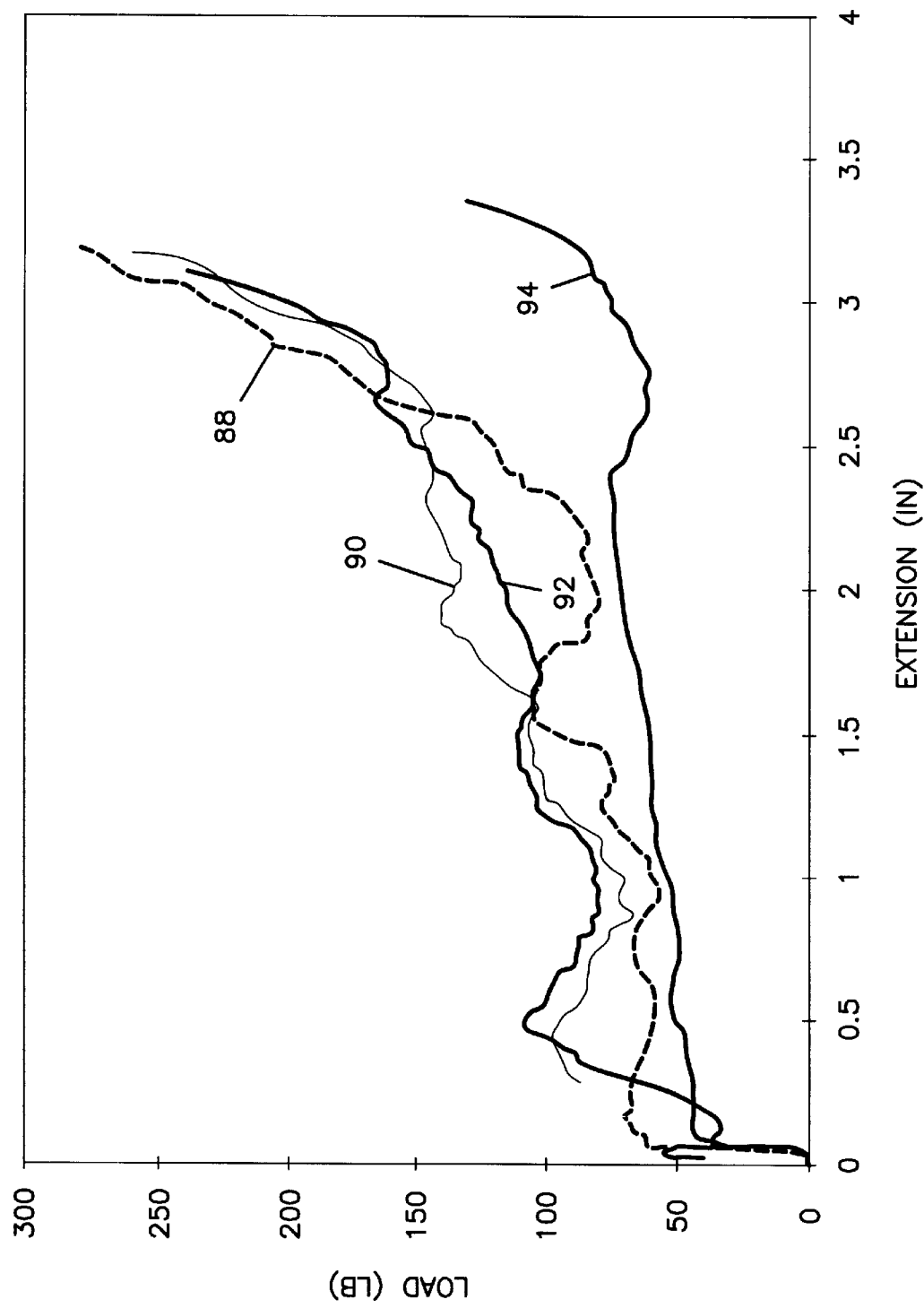

FLEXIBLE HOSE AND METHOD FOR MANUFACTURING

FIELD OF THE INVENTION

The present invention relates generally to flexible hoses and methods for manufacturing such hoses. More particularly, the present invention relates to flexible hoses for use in vehicular exhaust systems and methods for manufacturing such hoses.

BACKGROUND OF THE INVENTION

Strip wound flex tube or hose has been in existence for over 100 years. Some common uses for strip wound flex tube include flexible electrical conduit, flexible pneumatic hose and flexible hose for use in truck exhaust systems. Throughout the specification, the terms "hose" and "tube" will be used interchangeably.

Strip wound flex hose is sometimes referred to as interlocked "S" hose. Typically, flexible hose is made of a strip of metal having a generally "S" shaped cross section including a first hook portion positioned opposite from a second hook portion. To form a hose body, the strip of metal is wrapped in a helical pattern. As the strip of metal is wrapped in the helical pattern the first and second hook portions of adjacent helical wraps are interlocked to form pivotal interlock seams of the hose body. Typical metals used in manufacturing flexible hose include galvanized steel, aluminized steel, and stainless steel.

A flexible hose segment used in a truck exhaust system is subjected to a very harsh, destructive environment. Hence, flexible hoses in truck exhaust systems are more likely to fail sooner than flexible hoses used in less harsh environments such as electrical or pneumatic applications. Common causes of flexible hose failure in truck exhaust systems include: (1) heat; (2) vibration from the engine and truck; (3) displacement from frame twists and engine motor mount flexing; (4) corrosion and carbon contamination; and (5) wear.

Engine heat causes thermal expansion of the flexible hosing incorporated within an exhaust system. A new piece of flexible tubing has sufficient flexibility to inhibit thermal stresses on the exhaust system parts. Unfortunately, heat causes the flexible tube to grow progressively more rigid with age. Consequently, older flexible tubing is subject to breakage due to thermal expansion/contraction.

Vibrations causing damage to flexible hoses in vehicle exhaust systems are commonly caused by engine vibrations and pressure pulsations in the exhaust gas flow. Such vehicular vibrations cause slight relative movement between the individual wraps of the flexible hose. The relative movement between adjacent convolutions of the hose causes the convolutions to rub against one another and abrade the flexible hosing.

Displacement of exhaust system tubing is produced primarily when a vehicle is shifting gears, or when the vehicle frame is twisted by impacts to the frame such as road bumps. Twisting of the vehicle frame produces bending moments on the exhaust system tubing and muffler that can cause breakage. Changes in torque associated with shifting gears can also cause vehicle engines to displace in their mounts thereby causing exhaust tubing connected to the engines to be displaced. New flexible tubing can readily absorb the movement associated with frame twist or engine torque motion. However, such movement can cause breakage of older, less flexible tubes.

Corrosion and carbon contamination also are responsible for flexible tubing failure. Depending on the choice of metal, exterior corrosion of a piece of flexible tubing is typically caused by rain, snow, and road salt. As the outside of the flexible tubing corrodes, the individual convolutions or wrapped segments become rigid with respect to one another. Heat can also cause corrosion or scaling of the metal. Carbon produced by diesel engines, along with the products of combustion such as weak acid, can further cause internal deterioration and inflexibility of flexible tubing.

The various factors mentioned above all contribute to flexible tubing failure. Typically, wear failure is caused by a combination of the above factors. For example, often a segment of flexible tube becomes inflexible forcing all motion to be concentrated on one convolution of the flexible tube segment. Frequently, the one convolution is located in the center of the segment. This, in turn, causes excessive motion and forces on the center of the segment which cause the flexible tubing to break at the center. Alternatively, a bending moment can be greatest at an end of a piece of tubing causing the tubing to break adjacent to the clamp.

SUMMARY OF THE INVENTION

One aspect of the present invention relates to a flexible hose, tube or conduit formed by a continuous strip having rounded lateral edges. The continuous strip is wound in a helical pattern to form a cylindrical hose body. The strip has a generally S-shaped cross section including an inner hook portion and an outer hook portion. The strip is wrapped helically such that the inner and outer hook portions of adjacent helical wraps interlock. The rounded edges of the strip inhibit wear of the flexible hose, increase the flexibility of the flexible hose, and facilitate utilizing roll forming techniques to manufacture the flexible hose.

Another aspect of the present invention relates to a method for making a flexible hose. The method includes the steps of providing a coil of material, slitting the coil of material into strips having lateral edges, and conditioning or finishing the lateral edges of at least one of the strips to remove burrs. The method also includes the step of shaping the strip such that the strip has a generally S-shaped cross section including first and second oppositely disposed hook portions. The method further includes the step of wrapping the strip in a helical pattern to form a cylindrical hose body, and interlocking the first and second hook portions of adjacent helical wraps as the strip is wrapped into the helical pattern.

A further aspect of the present invention relates to using a lubricant to inhibit wear in a length of flexible S-type tubing.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated and constitute a art of this specification, illustrate several aspects of the invention and together with the description, serve to explain the principles of the invention. A brief description of the drawings is as follows:

FIG. 17 is a graph illustrating additional comparative extension test results after 250,000 cycles of vibration testing at 20 hertz and ½ inch displacement.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

In analyzing failed flexible hose samples, it has been determined by the inventors that the manufacturing process conventionally employed to manufacture flexible hose has been at least a partial cause of some hose failures. For example, as described in the Background of the Invention, flexible hose is commonly made of a thin strip of metal that is sheared or slitted from a wide coil of metal. The slitting or shearing process generates square sheared edges with a burr located on opposite sides of the strip width. As will be described in greater detail below, when the strip is formed into a new piece of flex hose, the burrs formed on opposite sides of the strip initiate wear of the flex hose. For example, it has been found that when a conventional strip of material is helically wound by a flex tube making machine that uses a roll forming process, the burrs at the edges of the strip make contact with successive convolutions of the newly formed flex hose thereby resisting the roll forming forces applied by the flex tube making machine. Additionally, during use of the flexible hose, vibrations and flexing of the hose causes the burrs to aggressively engage adjacent convolutions or wraps of the flexible hose thereby causing abrasion and galling of the flexible hose and eventual failure.

Figure 1:
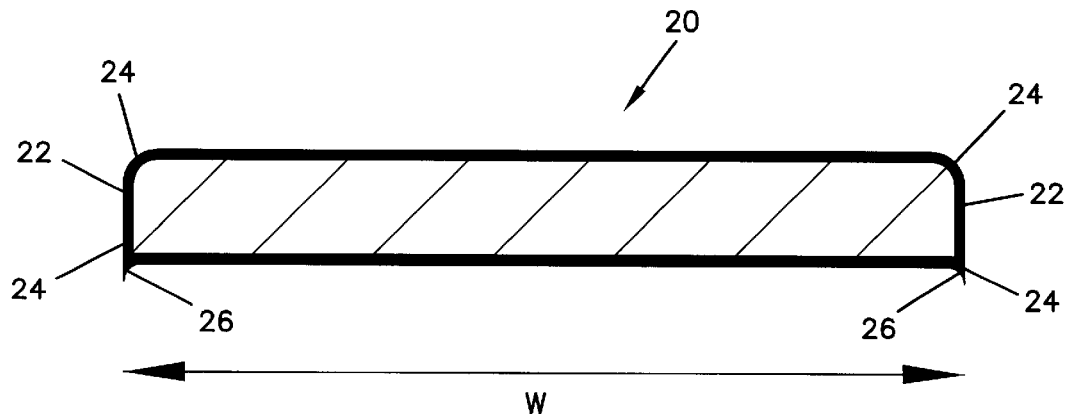
FIG. 1 is a cross sectional view cut through a conventional strip used to manufacture flexible hose.

FIG. 1 shows a strip of material 20 that has been cut or slit from a wider coil of material. The strip 20 includes a pair of oppositely disposed sides 22 extending along the length of the strip 20. A width W of the strip 20 extends between the sides 22. Each of the sides 22 includes a pair of lateral edges 24. As shown in FIG. 1, the lower most lateral edges 24 include burrs 26 formed during the slitting process. It will be appreciated that the drawings are not to scale, and that in certain views the burs 26 are exaggerated in size for the purpose of illustration.

Figure 2:
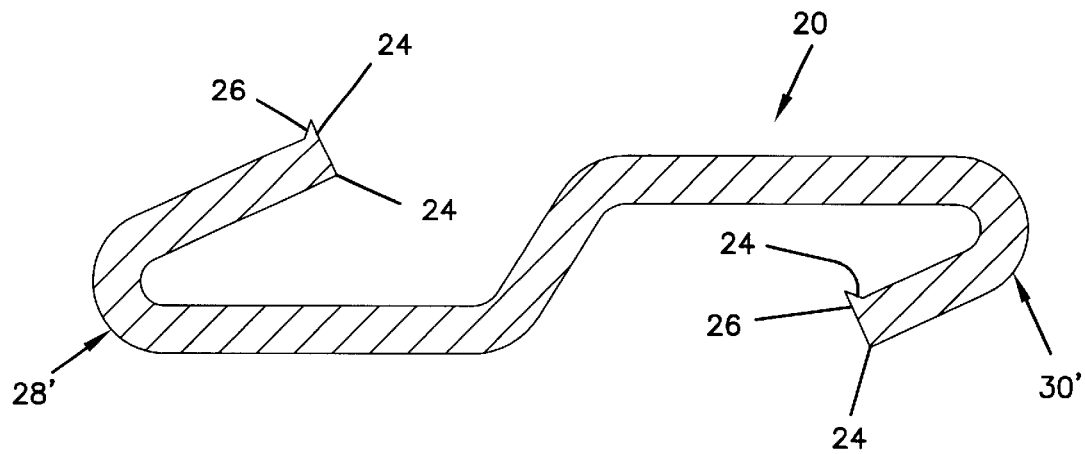
FIG. 2 is a cross sectional view of the strip of FIG. 1 after having been formed into a precursor S-shaped cross section.
Figure 3:
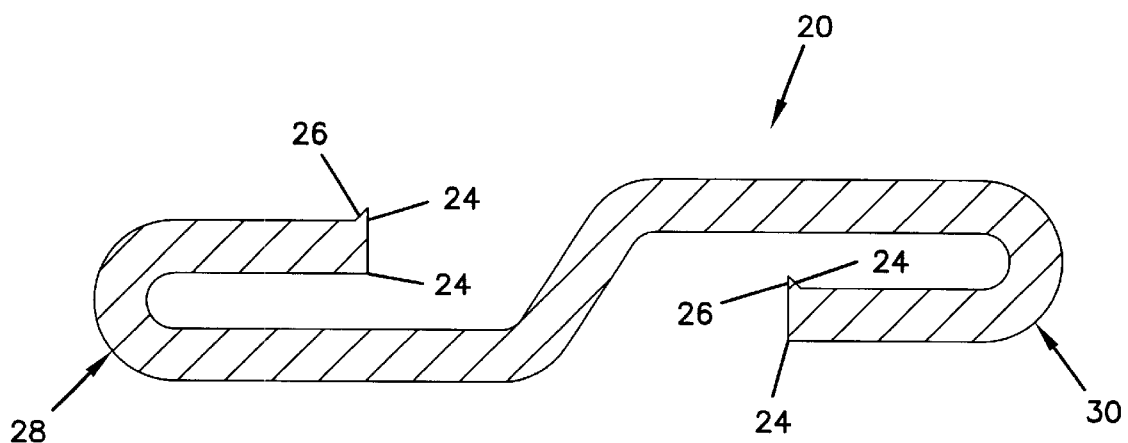
FIG. 3 is a cross sectional view of the strip of FIG. 1 after having been formed into a final S-shaped cross section.

To manufacture a piece of flexible hose from the strip 20, the width W of the strip 20 is first shaped into a precursor S-shaped cross section having first and second precursor hook portions 28' and 30' as shown in FIG. 2. Next, the strip 20 is helically wrapped while concurrently the first and second precursor hook portions 28' and 30' of adjacent wraps are interlocked and clenched together to form final hook portions 28 and 30 shaped as shown in FIG. 3. Typically, the wrapping and interlocking of the strip 20 is performed through the use of a roll forming machine or other type of flexible hose manufacturing machine that is conventionally known in the art.

Figure 4:
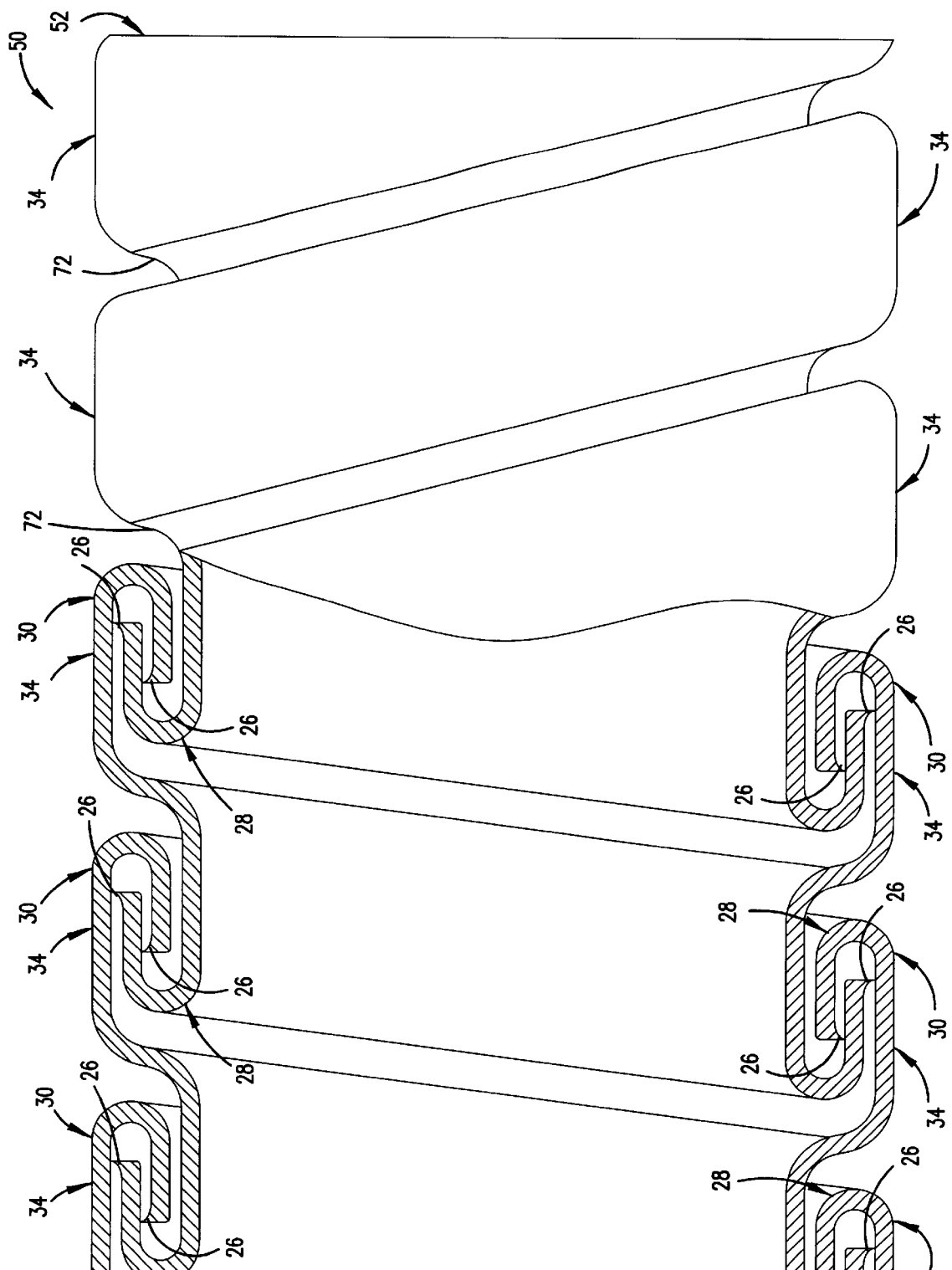
FIG. 4 is a diagrammatic cut-away view taken along a length of prior art flexible tubing.

FIG. 4 illustrates a piece of prior art flexible hose 32 manufactured by helically wrapping the strip 20. As shown in FIG. 4, the first and second hook portions 28 and 30 of adjacent or sequential helical wraps 34 are interlocked to form a plurality of flexible joints disposed along the length of the flexible hose 32. When the strip 20 is helically wrapped and interlocked, as shown in FIG. 4, the burrs 26 located at the lateral edges of the strip 20 at least partially inhibit flexation at the joints of the flexible hose 32. For example, burrs 26 associated with the second hook portions 30 project against or otherwise engage corresponding first hook portions 28 interlocked with the second hook portions 30. Similarly, burrs 26 associated with the first hook portions 28 project against or otherwise engage corresponding second hook portions 30 that are interlocked with the first hook portions 28. When the flexible hose 32 is subjected to vibrations or is flexed, the burrs 26 abrade and gall adjacent helical wraps 34 of the flexible hose 32 thereby reducing the useful life of the hose 32.

To overcome the above-identified problems, the present invention teaches manufacturing a flexible hose from a strip of material having lateral edges that have been conditioned to remove burrs. For example, the lateral edges can be skived, roller conditioned, burnished or otherwise deburred prior to helically wrapping the strip 20 to form a piece of flexible hose. In certain embodiments of the present invention, the lateral edges of the strip are conditioned by rounding the lateral edges. In one particular embodiment of the present invention, the edges are rounded to form generally 90° fillets that provide a continuous 180° curvature at the sides of the strip.

It will be appreciated that flexible hose or tubing in accordance with the principles of the present invention can be used for a variety of applications such as electrical conduit, and flexible pneumatic hose. However, flexible hose constructed in accordance with the principles of the present invention is particularly suited for use in high vibration/flexation environments such as vehicular exhaust systems or other engine exhaust systems. More particularly, flexible hose constructed in accordance with the principles of the present invention is ideally adapted for use in exhaust systems for vehicles having diesel engines such as truck exhaust systems, construction equipment exhaust systems, and farm tractor exhaust systems.

Figure 5:
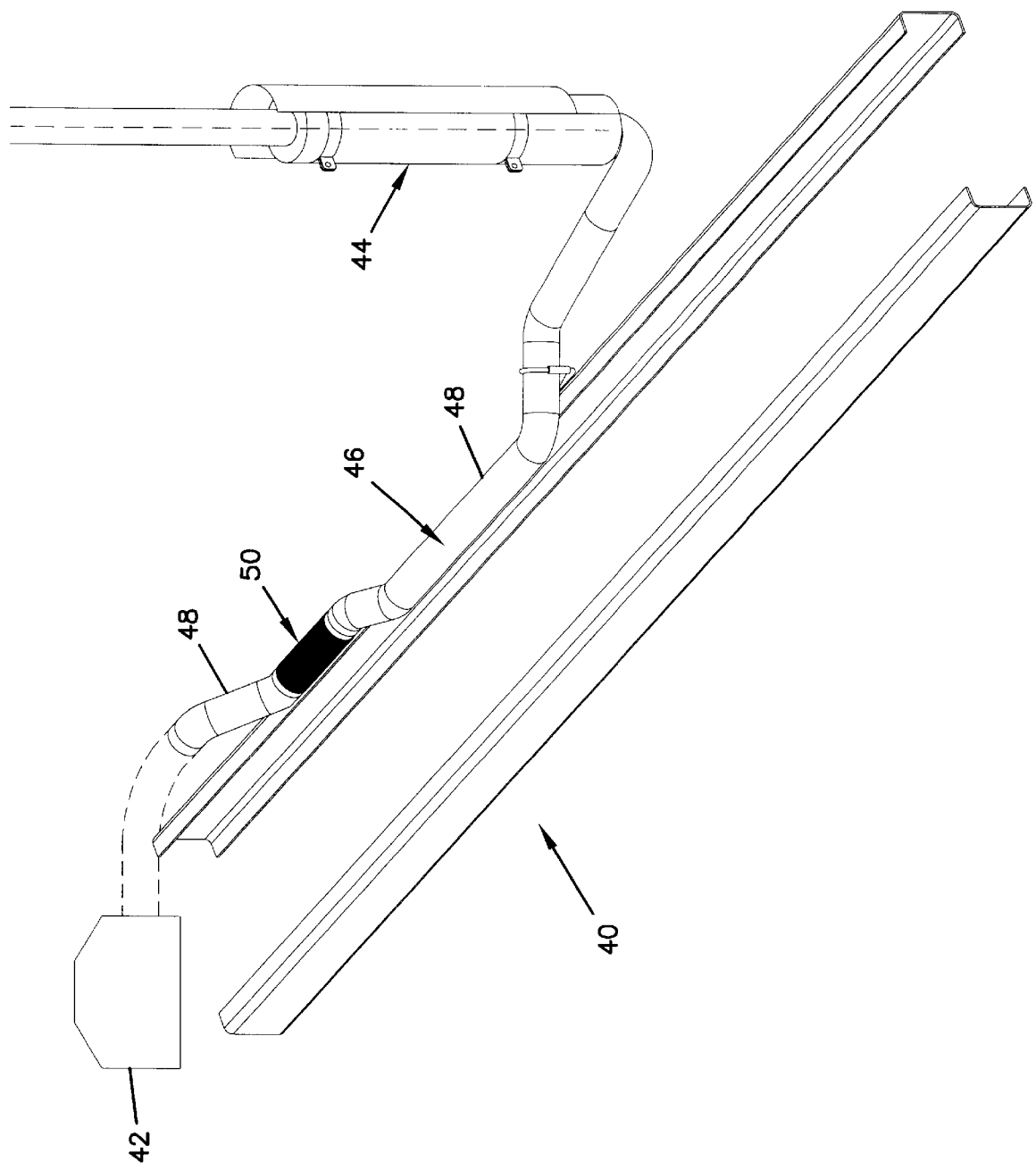
FIG. 5 is a schematic illustration of one embodiment of a truck exhaust system constructed in accordance with the principles of the present invention.

FIG. 5 illustrates a truck exhaust system 40 constructed in accordance with the principles of the present invention. Generally, the exhaust system 40 includes a motor such as a diesel engine 42 (shown schematically) or an internal combustion engine. Additionally, the exhaust system 40 includes a muffler 44 and an exhaust conduit 46 for conveying exhaust gases from the engine 42 to the muffler 44. Preferably, portions of the exhaust conduit 46 comprise relatively inflexible exhaust tubing 48, while at least a portion of the exhaust conduit 46 also includes a length of flexible hose 50. The flexible hose 50 is adapted for absorbing vibrations and displacements commonly associated with vehicular applications.

Figure 6:
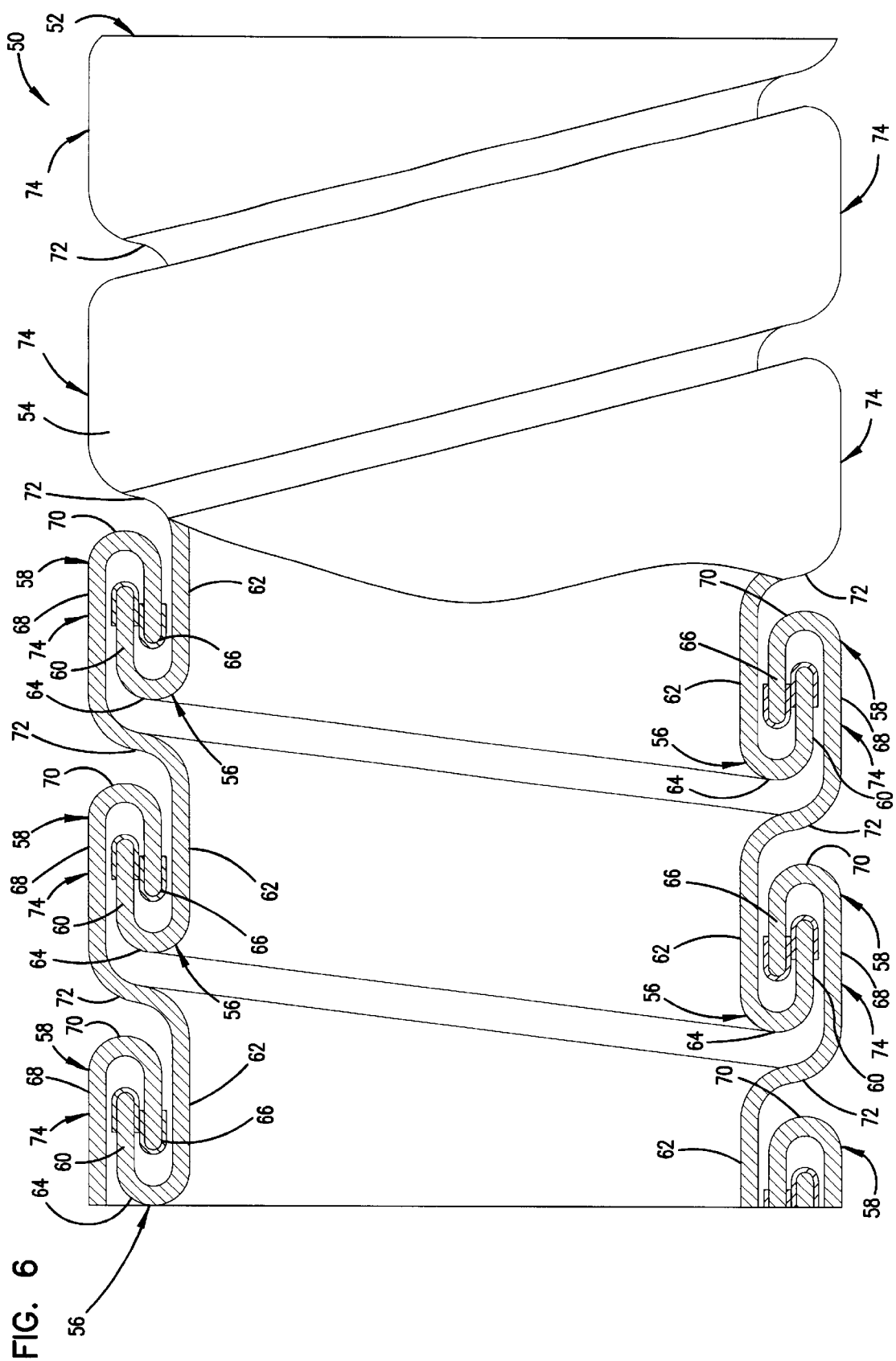
FIG. 6 is a diagrammatic cut-away view taken along a length of flexible tubing constructed in accordance with the principles of the present invention.

The flexible hose 50 includes inventive features for inhibiting wear of the flexible hose 50. As shown in the view of FIG. 6, the flexible hose 50 includes a cylindrical hose body 52 that is formed by a continuous strip 54 that is wound in a helical pattern. The strip 54 includes rounded lateral edges and has a generally S-shaped cross section. For example, the S-shaped cross section of the strip 54 includes an inner hook portion 56 and an outer hook portion 58. The strip 54 is helically wrapped such that the inner and outer hook portions 56 and 58 of adjacent wraps or convolutions interlock.

The inner hook portion 56 of the strip 54 includes first and second opposing portions 60 and 62 interconnected by a curved portion 64. Similarly, the outer hook portion 58 of the strip 54 includes first and second opposing portions 66 and 68 interconnected by a curved portion 70. As shown in the cross sectional view of FIG. 6, the first and second opposing portions 60, 62 and 66, 68 are generally straight and substantially parallel. The second portion 62 of the inner hook portion 56 is connected to the second opposing portion 68 of the outer hook portion 58 by a connecting member 72. As shown in the cross sectional view of FIG. 6, the connecting portion 72 is generally straight and is obliquely aligned with respect to the second opposing portions 62 and 68 of the inner and outer hook portions 56 and 58.

Referring again to FIG. 6, the strip 54 is wrapped in a plurality of helical turns or convolutions 74. The first opposing portion 60 of each convolution is interleaved between the first and second opposing portions 66 and 68 of an adjacent convolution 74. Similarly, the first opposing portion 66 of each convolution 74 is interleaved between the first and second opposing portion 60 and 62 of an adjacent convolution 74. Such an interleaved configuration is arranged and configured to provide a flexible interlock between each convolution 74 of the flexible hose 50.

As mentioned above, the edges of the strip 54 are rounded to inhibit wear of the flexible hose 50. As shown in the enlarged view of FIG. 7, each of the inner and outer hook portions 56 and 58 includes a distal end 76 having a pair of edges 78. The edges 78 have been rounded to form 90° fillets that cooperate to form a continuous 180° curvature at each distal end 76. While it is preferred for the distal end 76 to have complete 180° curvatures, it will be appreciated that in certain embodiments the edges can be rounded so as to form fillets or curvatures having less than 90°.

To further inhibit wear of the flexible hose 50, a lubricant 79 can be applied to the edges 78 of the strip 54. For example, dry film lubricant can be applied to the edges of the strip 54. In one particular embodiment, a high temperature lubricant including a dispersion of graphite and synthetic oil is used at the edges. One such lubricant is sold by Dow Corning under the designation C40. In other particular embodiments, a dry film lubricant includes a dispersion of molybdenum disulfate ($MoS_1$), graphite and a resin in solvent. Such a dry film lubricant is available from Dow Corning under the designation 321. Preferred lubricants adapted for use with the hose 50 include high temperature lubricants capable of withstanding temperatures greater than 750° F. It will be appreciated that lubricants can be used in combination with the edge conditioning techniques described above, or independently from such edge conditioning techniques.

The various aspects of the present invention provide numerous advantages. For example, by rounding the edges of a strip prior to roll forming the strip into a tube body, the roll forming forces required to helically wrap the strip are reduced. Specifically, as compared to square edges having burrs, the rounded edges provide reduced resistance to the roll forming process. Also, in testing flexible hose constructed in accordance with the principles of the present invention, it has been determined that by rounding or deburring the edges of the strip prior to manufacturing flexible hose, the resultant hose has increased flexibility as compared to conventional flexible hose, having unconditioned edges, wrapped at the same tension. Consequently, flexible hose constructed in accordance with the principles of the present invention can be wrapped at tighter tensions while maintaining the same flexibility achieved by conventional flexible hose. By wrapping the flexible hose in tighter helical convolutions, it has been determined that leakage through the flexible hose can be reduced.

Figure 7:
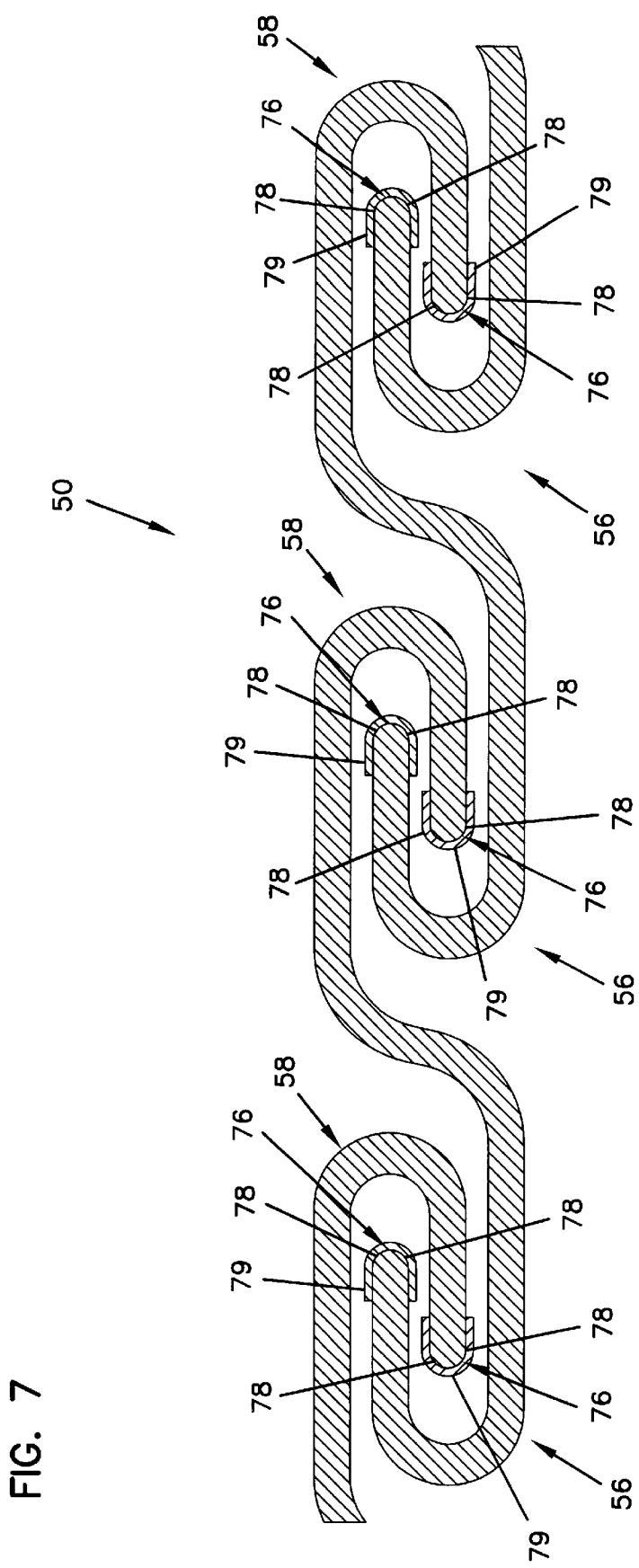
FIG. 7 is an enlarged view of a portion of FIG. 6.
Figure 8:
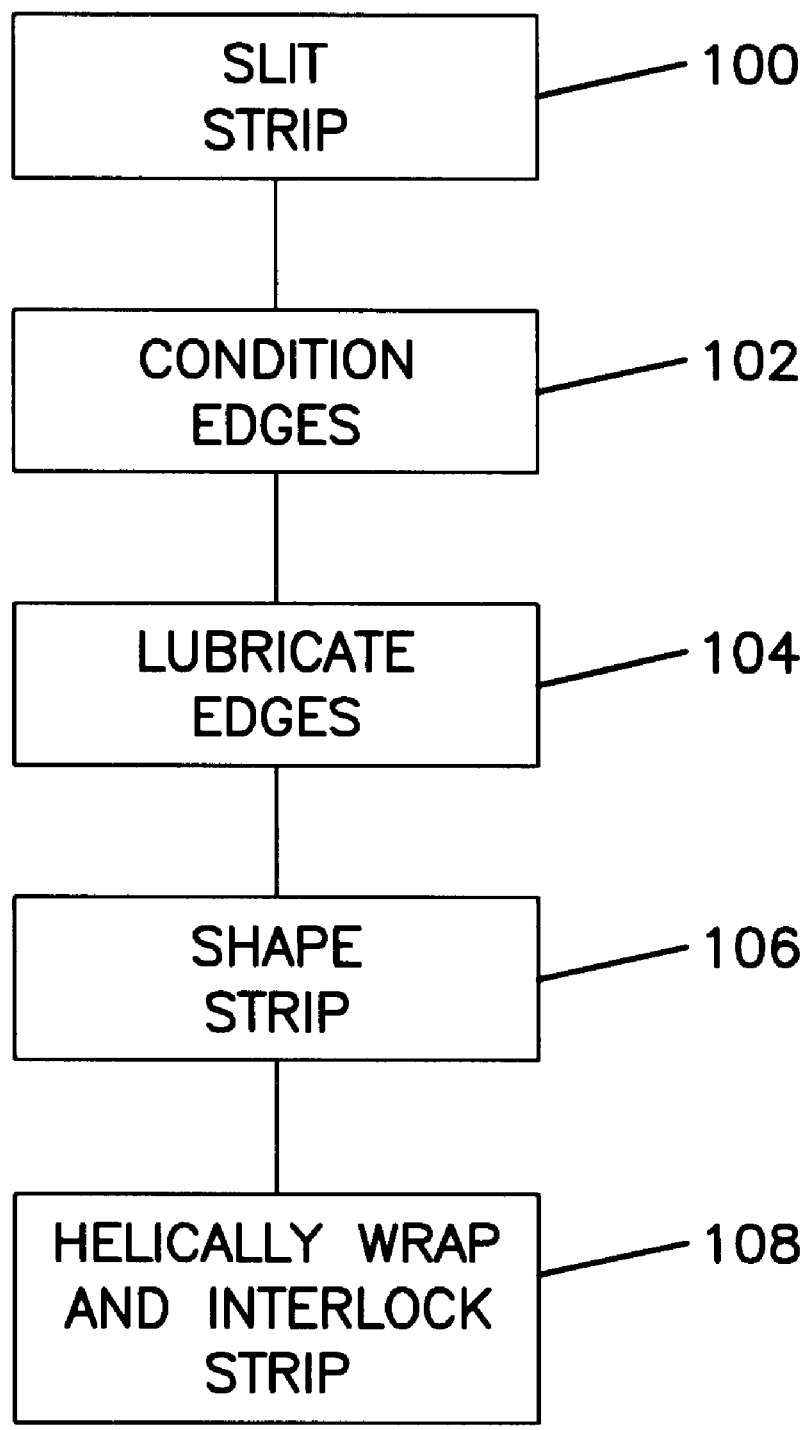
FIG. 8 is a flowchart showing one embodiment of a method in accordance with the principles of the present invention.

FIG. 8 illustrates an embodiment of a method in accordance with the principles of the present invention for making flexible hose such as the flexible hose 50 depicted in FIGS. 5, 6 and 7. The method includes a step 100 of slitting a strip from a relatively wide coil of material such as galvanized, aluminized, or stainless steel. The method also includes a step 102 of conditioning the edges of the strip by techniques such as skiving, rolling, burnishing or deburring. The method also includes a step 104 of lubricating the conditioned edges of the strip. Furthermore, the method includes a step 106 of shaping the strip such that the strip has a precursor generally S-shaped cross section. Finally, the method includes a step 108 of wrapping the shaped strip in a helical pattern while concurrently interlocking and clenching hook portions of adjacent helical wraps so as to form a generally cylindrical, jointed hose body.

A variety of conventional precision slitting machinery exists for conducting the slitting step 100 of the method shown in FIG. 8. For example, suitable slitting machinery can be acquired from Ruesch Machinery Company of Kenilworth, N.J. Typically, when a strip is formed by a slitting process, the strip will have a cross section similar to the prior art strip 20 illustrated in FIG. 1. As shown in FIG. 1, a strip 20 has burrs 26 located at opposite lateral edges 24 of the strip 20.

The edge conditioning step 102 preferably utilizes a skiving or cutting process. Skiving involves using a skiving or cutting tool to remove unwanted material from the edges of the strip such that a desired edge shape is left behind. Typically, the cutting tool remains stationary and the material desired to be skived is moved along the cutting tool. Skiving is advantageous because it does not result in substantial thickening or work hardening and therefore provides an accurate edge treatment.

Figure 9A:
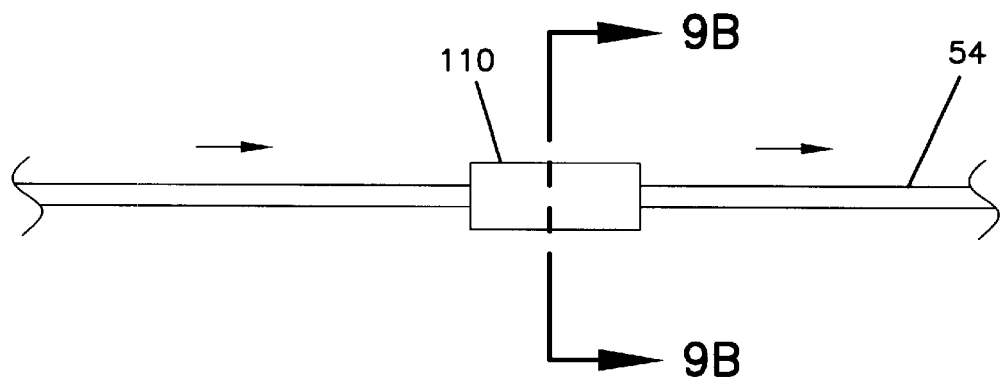
FIG. 9A is a side view of a schematic skiving machine.
Figure 9B:
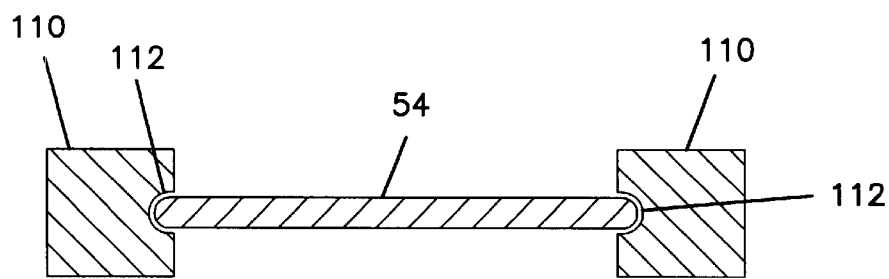
FIG. 9B is a cross sectional view taken along section line 9B—9B of FIG. 9A.

FIGS. 9A and 9B provide a schematic depiction of a skiving process for conditioning the edges of the strip 54 shown in FIGS. 5, 6 and 7. As shown in FIGS. 9A and 9B, cutting tools 110 are positioned on opposite sides of the strip 54. The cutting tools 110 include semicircular cutting blades 112 adapted to cut the edges of the strip 54 such that 180° curvatures are provided on opposite sides of the strip 54.

Preferably, the cutting blades 112 remain at a fixed location while the strip 54 is translated past the blades 112 causing the edges to be conditioned. Also, at slow speeds of the strip 54, vibration of the cutting blades 112 can assist in the skiving process.

Figure 10:
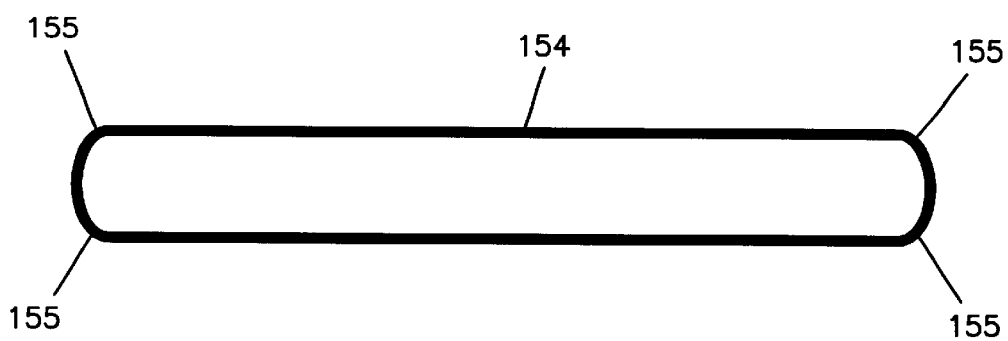
FIG. 10 is a cross sectional view through a strip having partially rounded edges.
Figure 11:
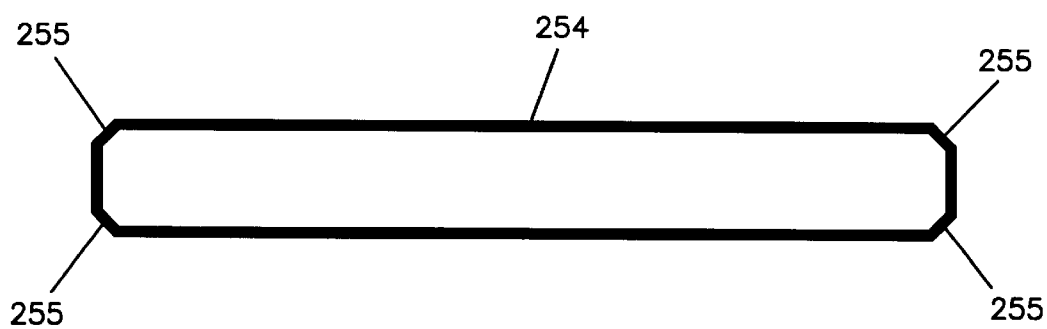
FIG. 11 is a cross sectional view through a strip having chamfered edges.
Figure 12:
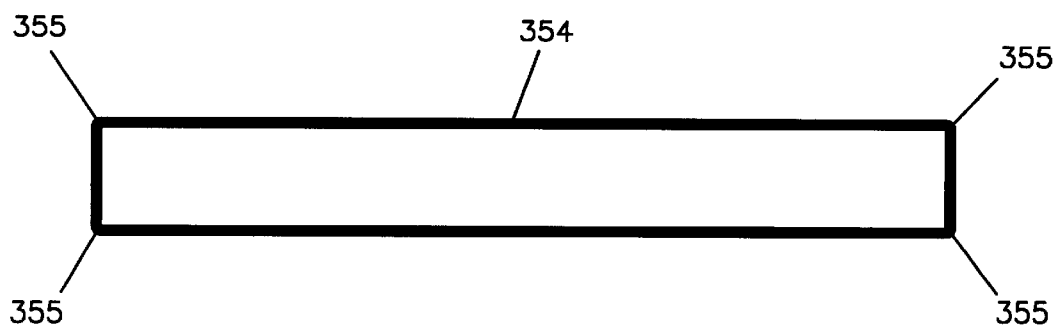
FIG. 12 is a cross sectional view through a strip having square deburred edges.

One broad concept of the present invention teaches conditioning the edges of a strip of material used to form an S-type flexible hose. Consequently, the present invention is not intended to be limited to skiving a 180° curvature at the sides of a particular strip. Instead, the present invention relates to making the edges of the strip less abrasive. For example, FIG. 10 shows an alternative strip 154 having edges 155 that are partially rounded. Similarly, FIG. 11 illustrates another strip 254 having edges 255 that have been chamfered to make the edges less abrasive or harsh. Furthermore, FIG. 12 illustrates another strip 354 having edges 355 that have been squared deburred to make the edges less abrasive.

While skiving is a preferred technique for conditioning the edges of a strip intended for use in making a flexible hose, other techniques such as burnishing and rolling can also be used. It will be appreciated that machines suitable for skiving, burnishing or rolling the edges of a strip are known. For example, suitable machines can be acquired from Barnes Advanced Technology, Inc. of Buffalo, N.Y.

The lubricating step 104 preferably involves the application of a high temperature lubricant to the edges of the strip. For example, prior to the shaping step 106, a lubricant can be sprayed, brushed, rolled or otherwise applied to the edges of the strip. Preferably, the lubricant is applied while the strip is in a coiled configuration. Alternatively, lubricant can be applied to the strip by spraying or dripping the lubricant onto the edges of the strip before adjacent convolutions of the strip are "S" formed together and interlocked. Furthermore, lubricant can also be applied to the strip after the wrapping step 108 by pouring or draining the lubricant through the manufactured hose and allowing it to seep between the joints of the hose thereby coating the edges of the strip.

A variety of materials can be used to lubricate the edges of the strip. For example, preferred lubricants include graphite as a lubricating agent. In certain embodiments, a dry film lubricant such as a dispersion of $MoS_2$, graphite and resin in solvent are utilized. For certain other embodiments, lubricants including a dispersion of graphite and synthetic oil can be used. It is preferred for the lubricants to be high temperature lubricants adapted to remain stable at temperatures exceeding 750° F. and that include a solid lubricating substance such as graphite or $MoS_2$.

The shaping step 106 of the method of FIG. 8 involves shaping the strip such that the strip has a precursor S-shaped cross section. Preferably, the shaping step 106 involves shaping the strip through the use of a roll forming process. The shaping step 106 also preferably involves clenching the strip from the precursor S-shaped cross section to the final S-shaped cross section (shown in FIGS. 6 and 7) during the helical wrapping step 108. Consequently, there is preferably some overlap in sequence between the shaping and helical wrapping steps 106 and 108.

With respect to the strip 54 of FIGS. 5, 6 and 7, during the helical wrapping step 108, the strip 54 is helically wrapped while concurrently the inner and outer hook portions 56 and 58 of adjacent wraps are interlocked. For example, as the strip 54 is helically wrapped, the first portion 60 of the inner hook portion 56 is inserted between the first and second portions 66 and 68 of the outer hook portion 58. Similarly, the first portion 66 of the outer hook portion 58 is inserted between the first and second portions 60 and 62 of the inner hook portion 56 while the strip 54 is helically wrapped. Once the inner and outer hook portions 56 and 58 are interlocked as described above, the first and second opposing portions 60, 62 and 66, 68 are clenched or compressed from a precursor S-shaped configuration to the final S-shaped configuration as shown in FIGS. 5, 6 and 7. The precursor S-shaped configuration facilitates interlocking the hook portions 56 and 58. The final S-shaped configuration provides a tight joint between adjacent convolutions.

It will be appreciated that flexible hose manufacturing machines capable of shaping a strip into an precursor S-shaped cross section, and then helically wrapping and interlocking the strip, are known in the art. For example, suitable machines for forming flex pipe from strips of metal are sold by Flexible Pipe by Detlor LTD of Mississagua, Canada. One particular machine sold by Flexible Pipe by Detlor LTD has model number PD-100.

Flexible hoses constructed in accordance with the principles of the present invention preferably have initial leak rates of less than 1.5 cu. f./min. at 4.5 lbs./in$^2$ internal air pressure and initial extensions greater than 20% from fully compressed.

FIGS. 13–17 illustrate test results comparing a sample of flexible hose constructed in accordance with the principles of the present invention with several samples of conventional flexible hose. In conducting the vibration cycles, each sample was mounted horizontal with one end fixed and one end vertically displaced ¼ inch above and below horizontal. The frequency of vertical displacement was 20 Hertz (20 times per second. Each sample had a 5 inch inner diameter; and a 15 inch length at 50% extension from fully compressed to fully extended.

Figure 13:
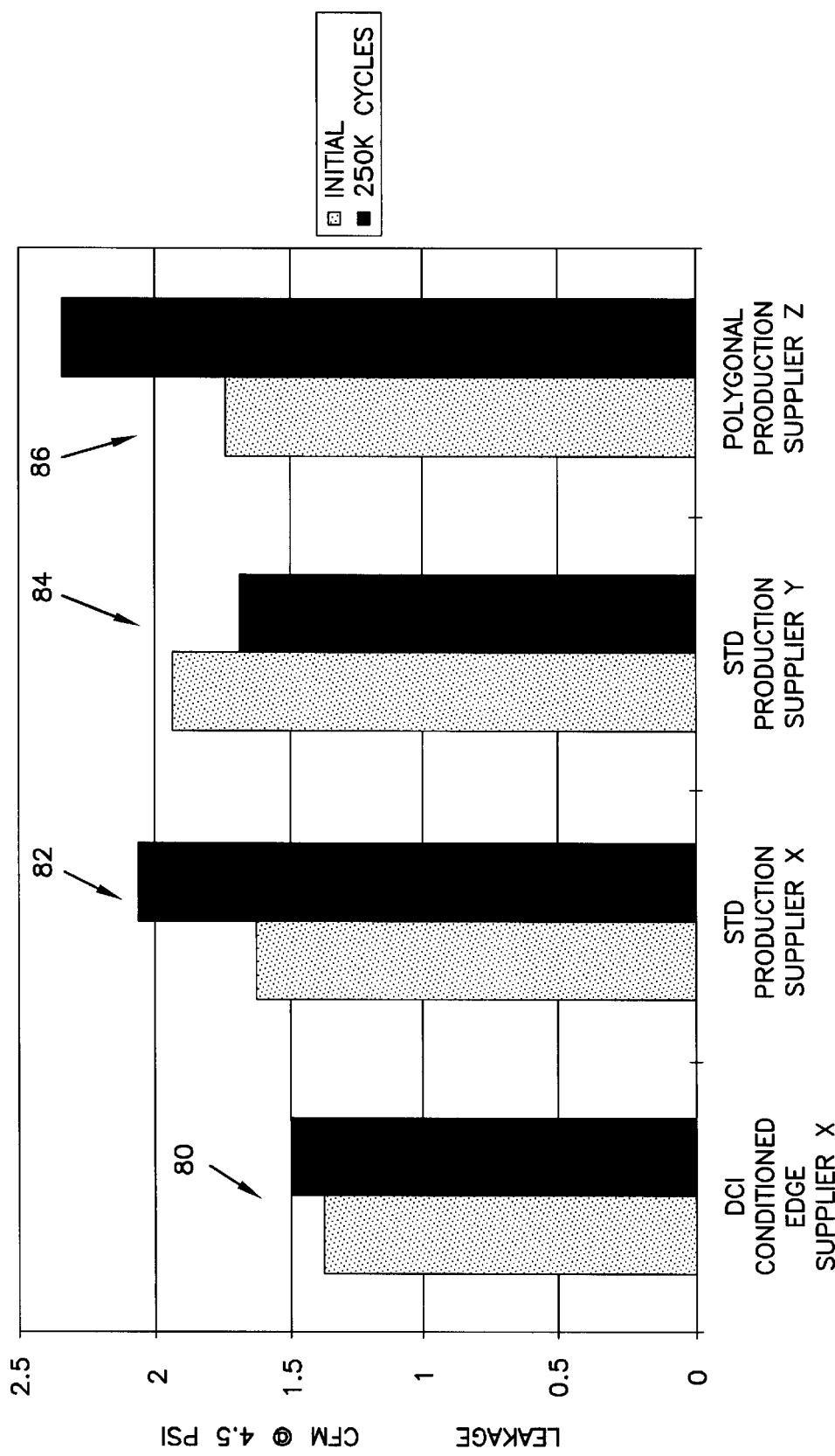
FIG. 13 is a bar graph illustrating comparative leak tests results.
Figure 14:
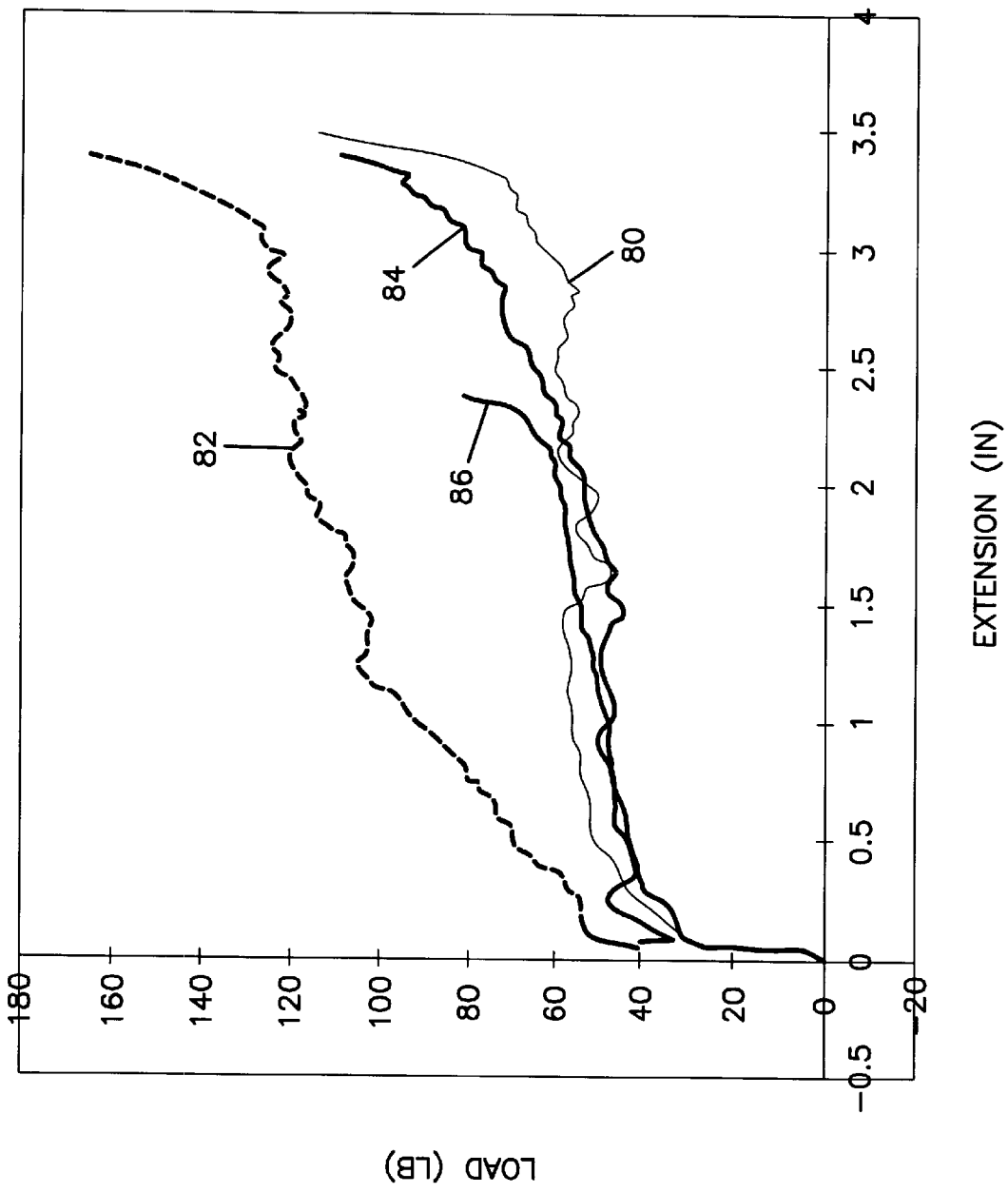
FIG. 14 is a graph illustrating comparative initial extension test results.
Figure 15:
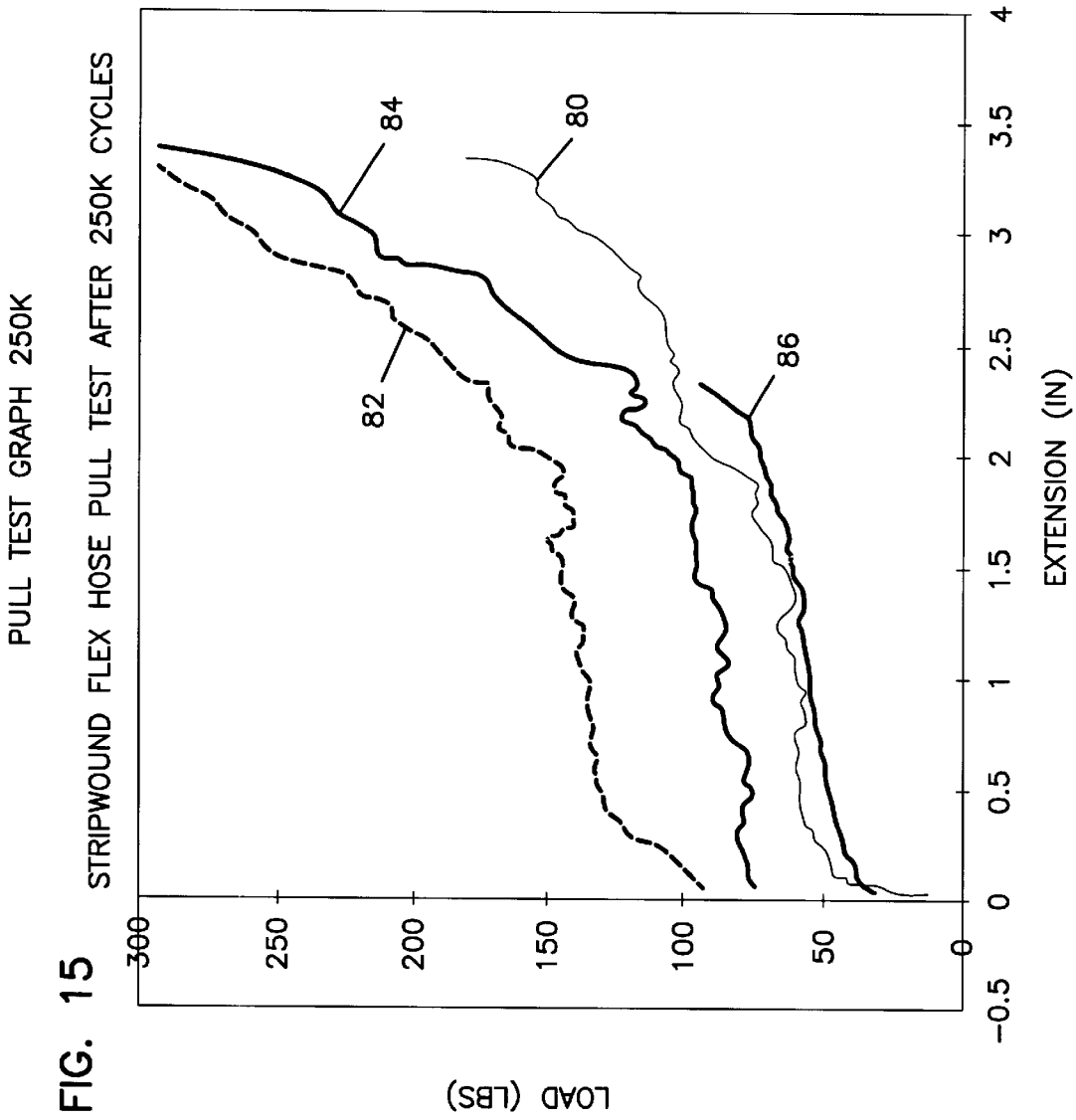
FIG. 15 is a graph illustrating comparative extension test results after 250,000 cycles of vibration testing at 2 hertz and ½ inch displacement.

In FIGS. 13–15, reference number 80 has been assigned to all data generated with respect to flex hose provided from supplier X that has been edge conditioned as shown in FIGS. 6 and 7. Also, reference number 82 has been assigned to all data generated with respect to standard flex hose provided from supplier X that has not been edge conditioned. Further, reference number 84 has been assigned to all data generated with respect to standard flex hose provided from supplier Y that has not been edge conditioned. Moreover, reference number 86 has been assigned to all data generated with respect to polygonal flex hose provided from supplier Z that has not been edge conditioned.

FIG. 13 illustrates the results of a leak test conducted on the samples identified above. For each of the samples, the left column represents initial testing of the samples, while the right column represents testing after 250,000 cycles. Referring to FIG. 13, a comparison of the data 80, 82, 84 and 86 demonstrates that the flexible hose constructed in accordance with the principle of the present invention had reduced leakage as compared to the prior art hose samples.

FIG. 14 illustrates initial pull test results relating to the samples identified above. Referring to FIG. 14, a comparison of the data 80, 82, 84 and 86 demonstrates that the sample of hose constructed in accordance with the principles of the present invention extended farther than the other test samples.

FIG. 15 is a graph illustrating pull test results conducted on the samples identified above after 250,000 cycles. Referring to FIG. 15, a comparison of the data 80, 82, 84 and 86 demonstrates that the sample representative of a flexible hose constructed in accordance with the principles of the present invention achieve greater extension than the other sample hoses.

Figure 16:
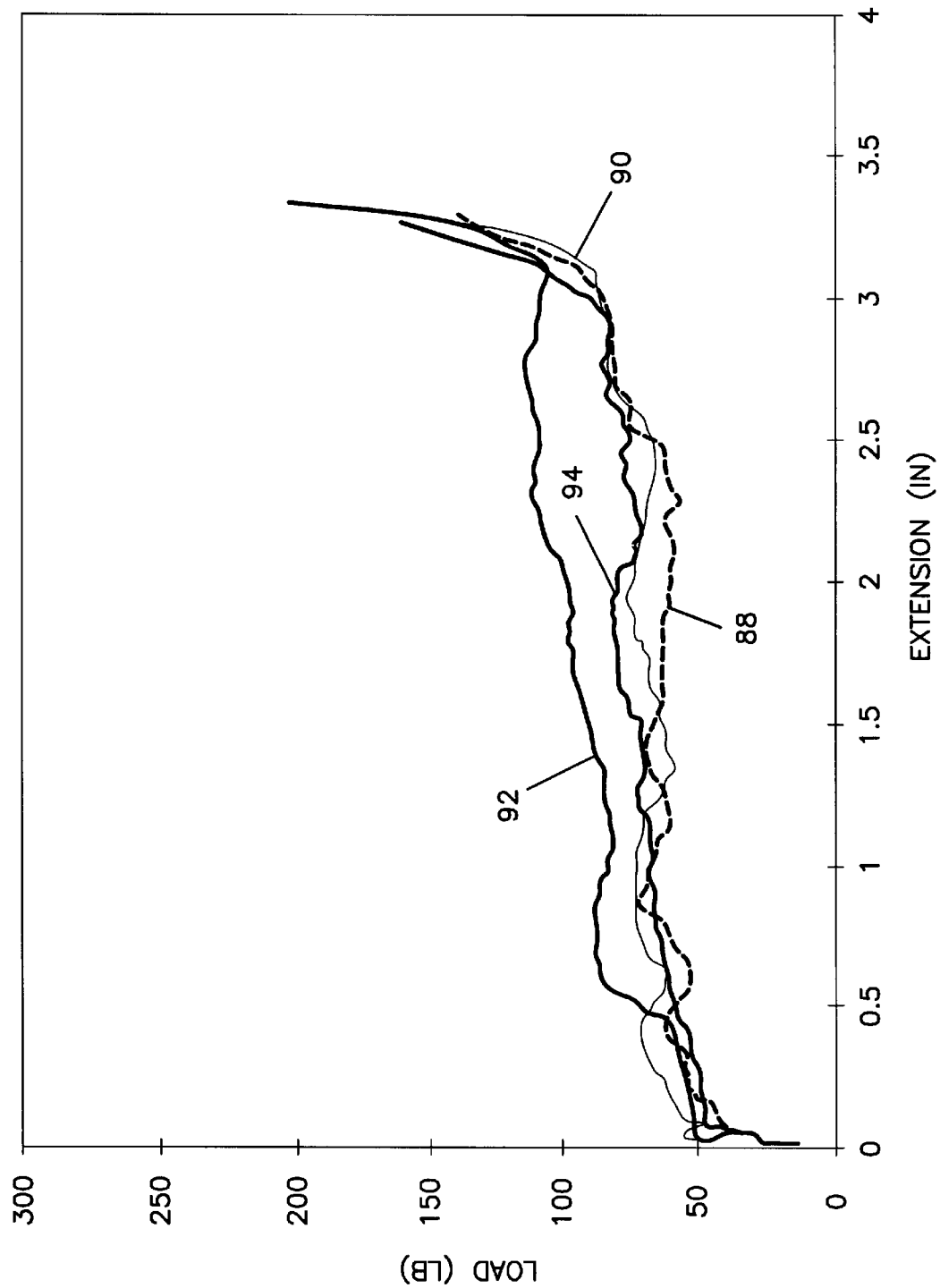
FIG. 16 is a graph illustrating additional comparative initial extension test results.

In FIGS. 16 and 17, reference number 88 has been assigned to all data generated with respect to relatively tightly wound flex hose provided from supplier X that has been edge conditioned as shown in FIGS. 6 and 7. Also, reference number 90 has been assigned to all data generated with respect to relatively loosely wound flex hose provided from supplier X that has been edge conditioned as shown in FIGS. 6 and 7. Further, reference number 92 has been assigned to all data generated with respect to standard flex hose provided from supplier Y that has not been edge conditioned. Moreover, reference number 94 has been assigned to all data generated with respect to relatively loosely wound flex hose provided from supplier X that has been edge conditioned as shown in FIGS. 6 and 7, and lubricated with synthetic oil.

FIG. 16 illustrates initial pull test results relating to the samples identified above, while FIG. 17 illustrates pull test results conducted on the samples identified above after 1,000,000 cycles.

With regard to the foregoing description, it is to be understood that changes may be made in detail, especially in matters in the construction materials employed and the shape, size, and arrangement of the parts without departing from the scope of the present invention. It is intended that the specification and depicted aspects be considered illustrative only with a true scope and spirit of the invention being indicated by the broad meaning of the following claims.

We claim:

1. A flexible hose comprising:
a continuous metal strip having rounded lateral edges, the strip being wound in a helical pattern to form a cylindrical hose body, the strip having a generally S-shaped cross section including an inner hook portion and an outer hook portion, the strip being wrapped helically about a longitudinal axis such that the inner and outer hook portions of adjacent wraps interlock, the inner and outer hook portions including interleaved portions that are aligned generally parallel to the longitudinal axis, the inner and outer hook portions being interconnected by an interconnect portion having only two bends, the two bends including first and second bends, the first bend curving in an opposite direction as compared to the second bend.

2. The flexible hose of claim 1, wherein the lateral edges of the continuous strip are rounded to generally form a 180° curvature along lateral sides of the strip.

3. The flexible hose of claim 1, further comprising a non-metallic lubricant disposed on the lateral edges of the strip.

4. The flexible hose of claim 3, wherein the lubricant is a dry film lubricant.

5. The flexible hose of claim 3, wherein the lubricant includes graphite.

6. The flexible hose of claim 3, wherein the lubricant is a high temperature lubricant that remains stable at temperatures that exceed 750° F.

7. The flexible hose of claim 3, wherein the lubricant includes $MoS_2$.

8. The flexible hose of claim 3, wherein the lubricant is located only on or adjacent to the lateral edges of the metal strip.

9. The flexible hose of claim 8 wherein the lubricant extends from a first side of the metal strip around the rounded lateral edges to a second side of the metal strip.

10. A vehicle exhaust system comprising:
an engine;
a muffler;
an exhaust conduit for conveying exhaust gas from the engine to the muffler, at least a portion of the exhaust conduit including a flexible hose comprising a continuous strip having rounded lateral edges, the continuous strip being wound in a helical pattern to form a cylindrical body, the strip having a generally S-shaped cross section including an inner hook portion and an outer hook portion, and the strip being wrapped helically about a longitudinal axis such that the inner and outer hook portions of adjacent wraps interlock, the inner and outer hook portions including interleaved portions that are aligned generally parallel to the longitudinal axis, the inner and outer hook portions being interconnected by an interconnect portion having only two bends, the two bends including first and second bends, the first bend curving in an opposite direction as compared to the second bend.

11. The vehicle exhaust system of claim 10, wherein the lateral edges of the strip are rounded to generally form 180° curvatures along lateral sides of the strip.

12. The vehicle exhaust system of claim 10, wherein the lateral edges of the strip are lubricated with a non-metallic lubricant.

13. A flexible hose comprising:
a continuous metal strip having rounded lateral edges, the strip being wound in a helical pattern to form a cylindrical hose body, the strip having a generally S-shaped cross section including an inner hook portion and an outer hook portion, the strip being wrapped helically about a longitudinal axis such that the inner and outer hook portions of adjacent wraps interlock, the inner and outer hook portions including interleaved portions that are aligned generally parallel to the longitudinal axis, the flexible hose including a region between the interleaved portions that is free of any intermediate metallic spacers.

14. The flexible hose of claim 13, further comprising a non-metallic lubricant disposed adjacent the lateral edges of the strip.

15. The flexible hose of claim 14, wherein the lubricant extends from a first side of the metal strip around the rounded lateral edges to a second side of the metal strip.

16. The flexible hose of claim 14, wherein only the lubricant is positioned in the region between the interleaved portions.

17. A flexible hose comprising:
a continuous metal strip having rounded lateral edges, the strip being wound in a helical pattern to form a cylindrical hose body, the strip having a generally S-shaped cross section including an inner hook portion and an outer hook portion, the strip being wrapped helically about a longitudinal axis such that the inner and outer hook portions of adjacent wraps interlock, the inner and outer hook portions including interleaved portions that are aligned generally parallel to the longitudinal axis, the flexible hose including a non-metallic lubricant positioned adjacent the rounded lateral edges.

18. The flexible hose of claim 17, wherein the lubricant extends from a first side of the metal strip around the rounded lateral edges to a second side of the metal strip.

19. The flexible hose of claim 17, wherein the lubricant is positioned between the interleaved portions.

* * * * *

UNITED STATES PATENT AND TRADEMARK OFFICE
CERTIFICATE OF CORRECTION

PATENT NO.       : 6,311,736 B2
APPLICATION NO. : 09/086073
DATED            : November 6, 2001
INVENTOR(S)      : Herman et al.

It is certified that error appears in the above-identified patent and that said Letters Patent is hereby corrected as shown below:

Col. 2, line 62: "constitute a art of" should read --constitute a part of--

Col. 3, line 33: "at 2 hertz and" should read --at 20 hertz and--

Col. 6, line 2: "disulfate ($MoS_1$)," should read --disulfate ($MoS_2$),--

Col. 8, line 22: "less than 1.5 cu. f./min." should read --less than 1.5 cu. ft./min.--

Signed and Sealed this

Twenty-fourth Day of October, 2006

JON W. DUDAS
*Director of the United States Patent and Trademark Office*